United States Patent
Panchal et al.

(10) Patent No.: US 10,218,858 B2
(45) Date of Patent: *Feb. 26, 2019

(54) DOWNLOAD ACCOUNT WITH SHARED DATA PLAN

(71) Applicant: Verizon Patent and Licensing Inc., Arlington, VA (US)

(72) Inventors: Jignesh S. Panchal, Somerset, NJ (US); Ratul Kumar Guha, Kendall Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

This patent is subject to a terminal disclaimer.

(21) Appl. No.: 15/266,493

(22) Filed: Sep. 15, 2016

(65) Prior Publication Data

US 2017/0019539 A1 Jan. 19, 2017

Related U.S. Application Data

(63) Continuation of application No. 14/107,142, filed on Dec. 16, 2013, now Pat. No. 9,471,937.

(51) Int. Cl.
*G07F 19/00* (2006.01)
*H04M 15/00* (2006.01)
*G06Q 30/04* (2012.01)
*G06Q 40/00* (2012.01)
*H04L 29/08* (2006.01)

(52) U.S. Cl.
CPC ........ *H04M 15/7652* (2013.01); *G06Q 30/04* (2013.01); *G06Q 40/00* (2013.01); *H04L 67/34* (2013.01); *H04M 15/8214* (2013.01); *H04M 15/60* (2013.01)

(58) Field of Classification Search
None
See application file for complete search history.

(56) References Cited

U.S. PATENT DOCUMENTS

| | | | |
|---|---|---|---|
| 9,092,802 B1 | 7/2015 | Akella | |
| 9,445,370 B2* | 9/2016 | Chueh | H04W 52/0258 |
| 9,635,188 B1* | 4/2017 | Bradley | H04M 15/60 |
| 9,699,325 B1* | 7/2017 | Shukla | H04M 15/8214 |
| 2004/0235457 A1 | 11/2004 | Florkey | |
| 2013/0196617 A1 | 8/2013 | Zalmanovitch | |
| 2014/0003342 A1 | 1/2014 | Sheriff | |
| 2014/0115514 A1 | 4/2014 | Hackborn | |
| 2014/0179266 A1 | 6/2014 | Schultz | |

* cited by examiner

*Primary Examiner* — Fateh M Obaid

(57) ABSTRACT

A device is configured to create an account including a plurality of members and a shared data plan. The device stores a content associated with the account and the shared data plan is set up to be charged for data used on an operating network to provide the content to the plurality of members associated with a plurality of operator networks. Further, the device provides the content to a user device associated with a member of the plurality of members. The content is provided through the operator network. The device charges the shared data plan for the amount of data used by the operator network to provide the content to the user device without causing a data plan between the member and the operator network to be charged for the amount of data.

20 Claims, 8 Drawing Sheets

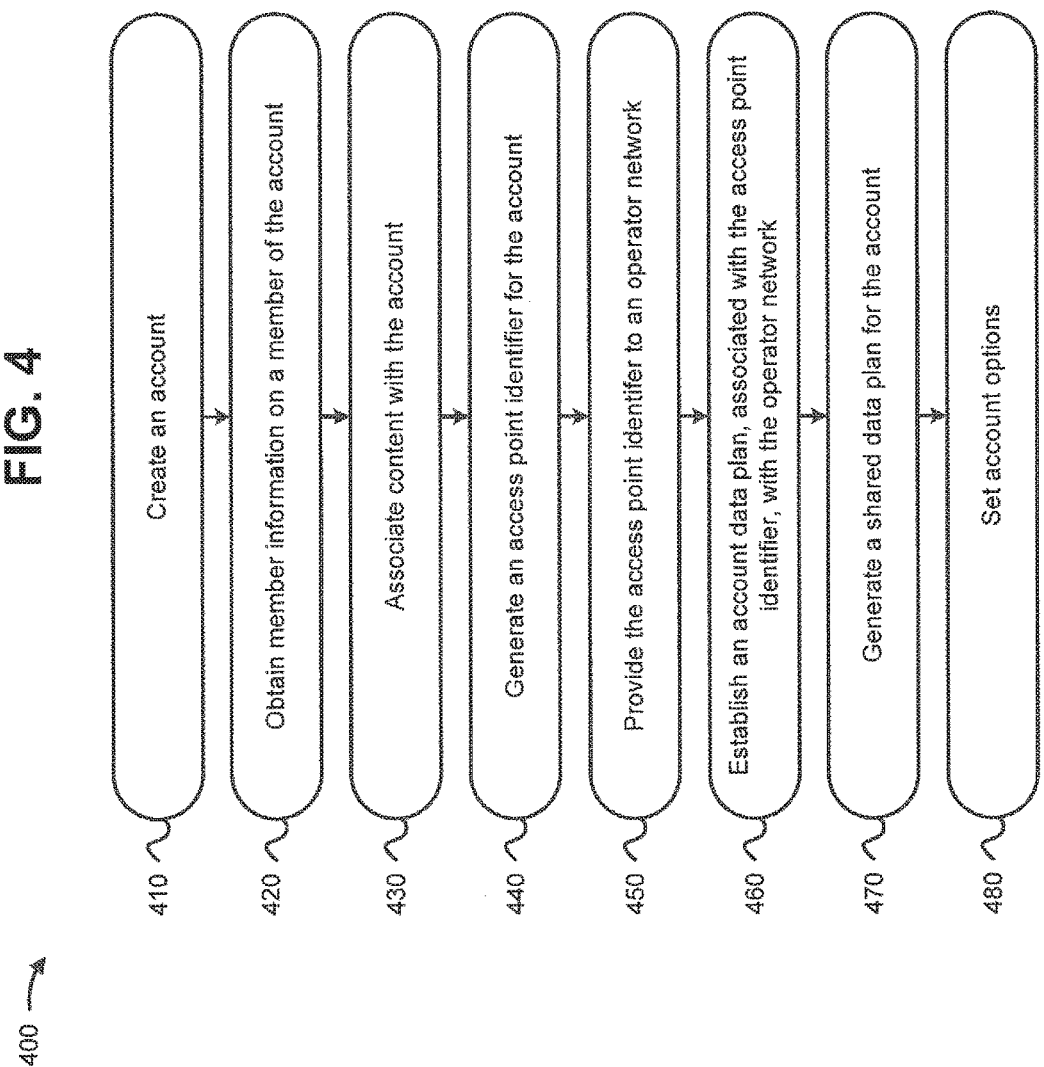

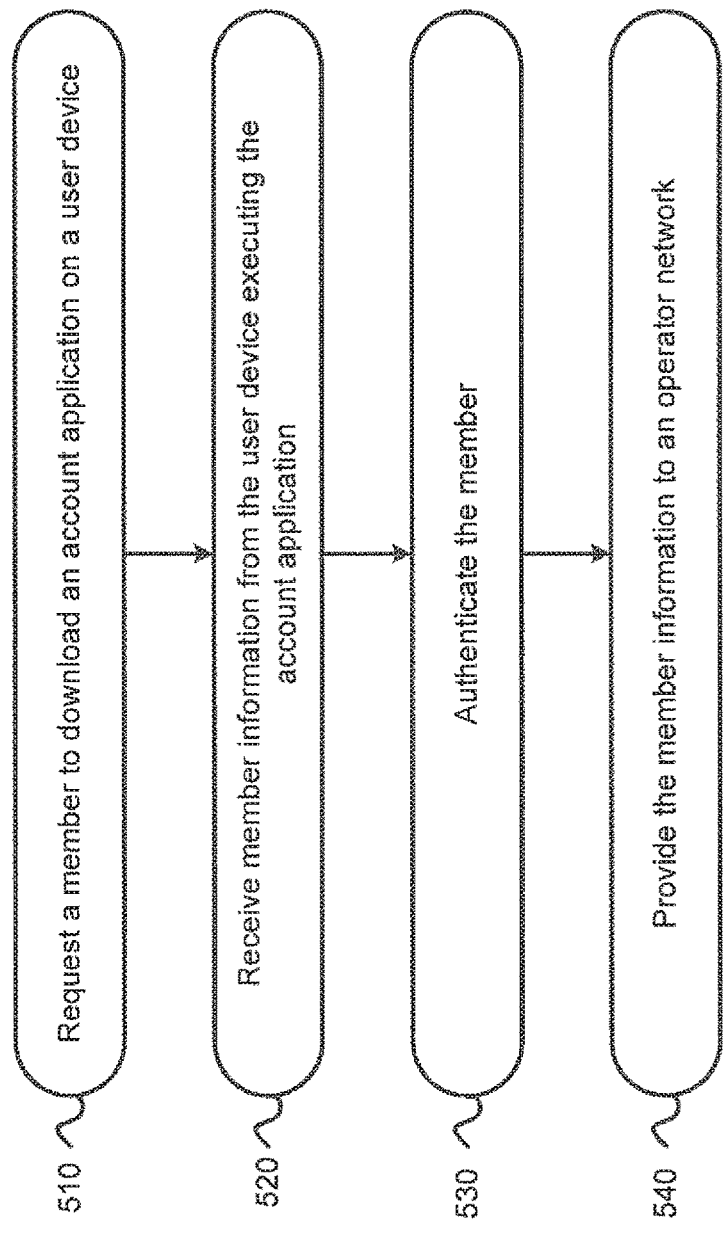

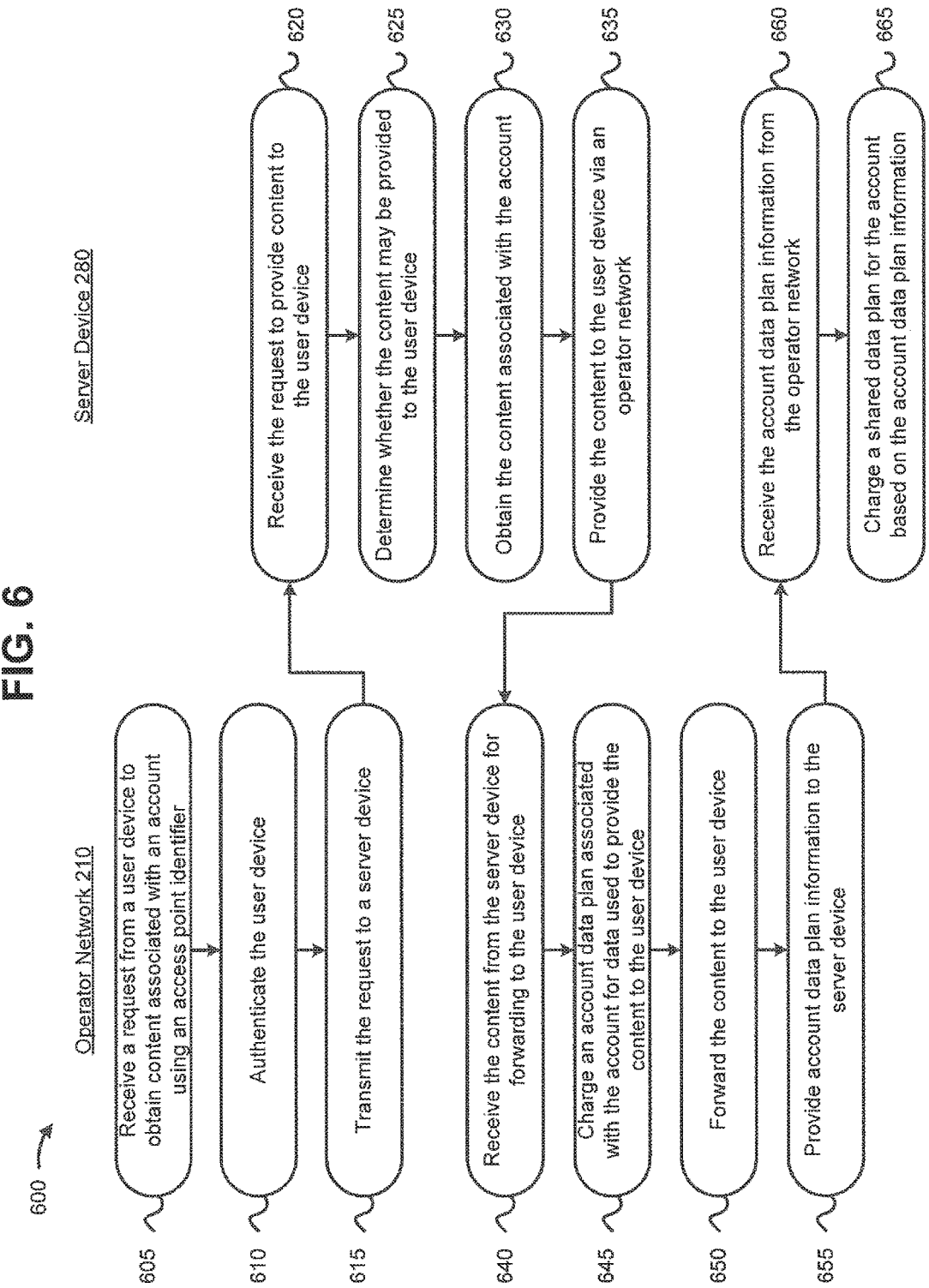

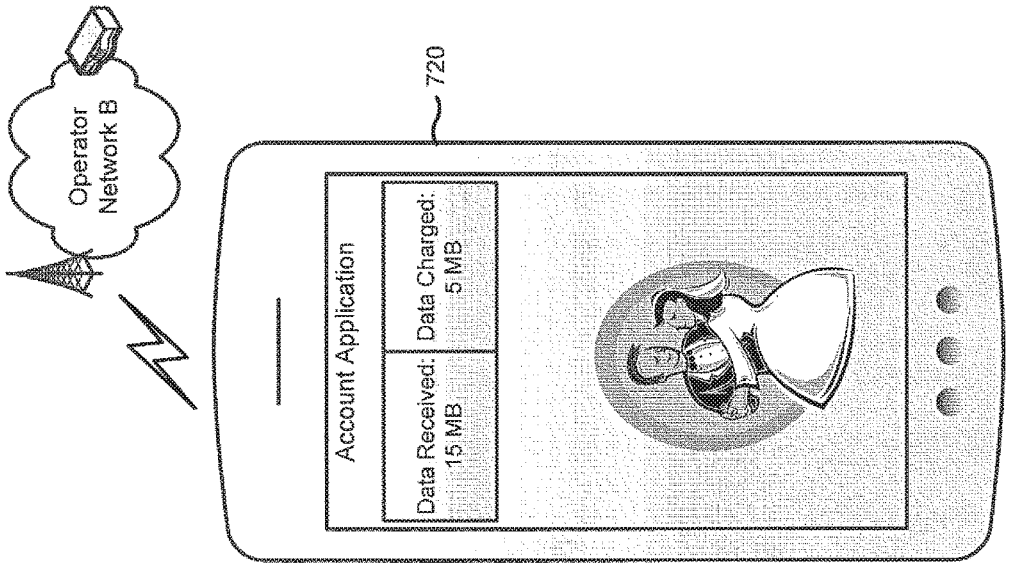
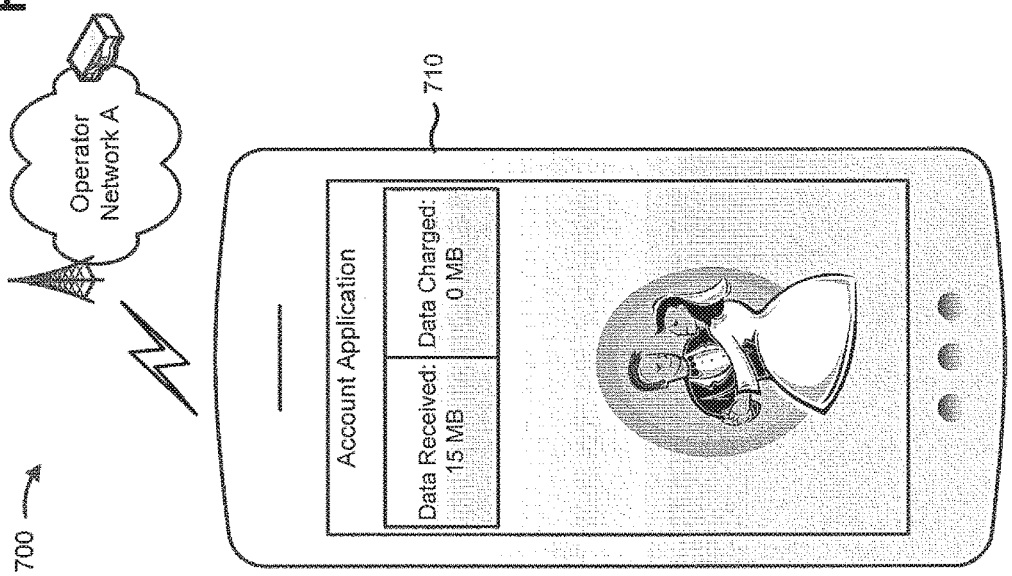
FIG. 7A

DOWNLOAD ACCOUNT WITH SHARED DATA PLAN

RELATED APPLICATION

This application is a continuation of U.S. patent application Ser. No. 14/107,142, filed Dec. 16, 2013, which is incorporated herein by reference.

BACKGROUND

User devices, such as smart phones, often use operator networks to download content. For example, a user device may have a data plan with an operator network allowing the user device to download data from the Internet. However, the operator network may charge the user's data plan based on the amount of data downloaded.

BRIEF DESCRIPTION OF THE DRAWINGS

FIG. 4 is a flowchart of an example process for creating and storing a download account;

FIG. 5 is a flowchart of an example process of authenticating a member of the download account;

FIG. 6 is a flowchart of an example process of providing content to a member of the download account and charging a shared data plan for the data used to provide the content; and FIGS. 7A and 7B are diagrams of an example implementation 700 relating to the process shown in FIG. 6.

DETAILED DESCRIPTION OF THE PREFERRED EMBODIMENTS

The following detailed description of example implementations refers to the accompanying drawings. The same reference numbers in different drawings may identify the same or similar elements.

People often use user devices (e.g., phones, tablets, etc.) to share pictures, videos, and other content taken at an event (e.g., a wedding, a photo shoot, etc.). Further, people often use user devices to download content from commercial entities. A person may rely on an operator network to download this media-rich content. However, the person may incur a data charge for downloading the content over the operator network, which may be taxing on the person's data plan. Accordingly, a person may be discouraged from downloading the content over the operator network. Implementations described herein allow members of a download account to download content over one or more operator networks using a shared data plan without a member's operator network data plan (e.g., a pre-paid or a post-paid plan) being charged for data used to provide the content over the member's operator network.

Figure 1:
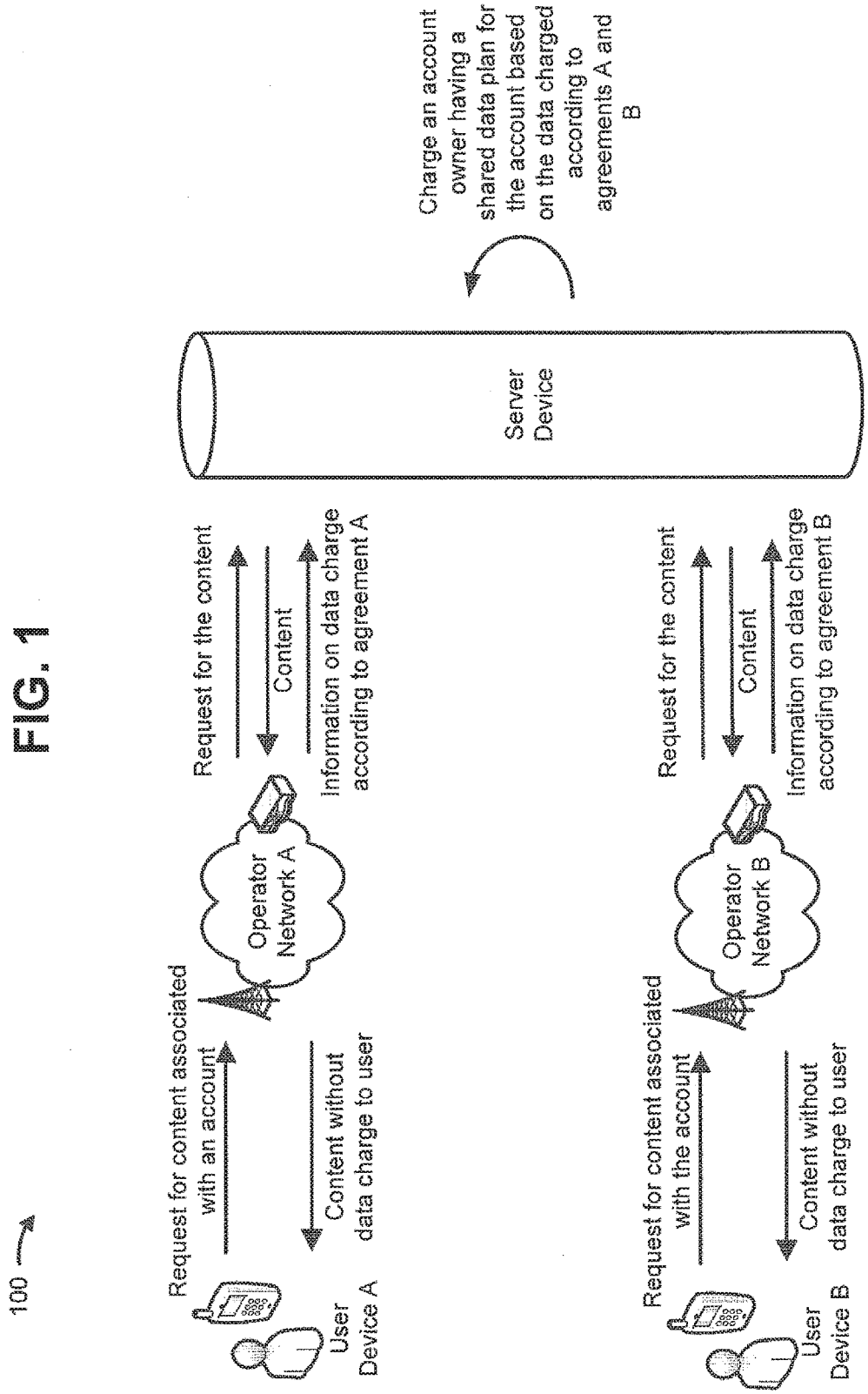
FIG. 1 is a diagram of an overview of an example implementation described herein.

FIG. 1 is a diagram illustrating an overview of an example implementation 100 described herein.

In example implementation 100, assume an account creator (i.e., an account owner) requests a server device to create a download account. Assume the download account allows members to share a data plan to download content associated with the download account over an operator network A and an operator network B. Further, assume that the server device has an agreement A with operator network A to pay for data used over operator network A, and that the server device has an agreement B with operator network B to pay for data used over operator network B.

As shown in FIG. 1, a first member of the download account may use a user device ("user device A") to transmit a request for the content associated with the download account to the server device via operator network A. The server device may receive the request, obtain the content associated with the download account, and provide the content to operator network A for transmission to the user device. Operator network A may provide the content to the user device without charging a data plan that the first member has with operator network A. Rather, operator network A may charge an owner of the server device for the data used to provide the content to the user device according to agreement A. Operator network A may then inform the server device of the data charge according to agreement A.

Likewise, a second member of the download account may use a user device ("user device B") to transmit a request for the content associated with the download account to the server device via operator network B. The server device may receive the request, obtain the content associated with the download account, and provide the content to operator network B for transmission to the user device. Operator network B may provide the content to the user device without charging a data plan that the second member has with operator network B. Rather, operator network B may charge the owner of the server device for the data used to provide the content to the user device according to agreement B. Operator network B may then inform the server device of the data charge according to agreement B.

The server device may charge the account owner by charging the shared data plan for the account for the data used to provide the content to the first member and the second member based on the data charged to agreements A and B. For example, an amount of data remaining in the shared data plan may be updated based on the data used by the first member and the second member.

In this way, members of the download account may download the content over different operator networks using a shared data plan and without the members' operator network data plans being charged. At the same time, the operator networks may still be paid by the account owner for the data used to transmit the content to the member. Moreover, the server device may make it easier, cheaper, and more desirable for members to download the content associated with the download account.

Figure 2:
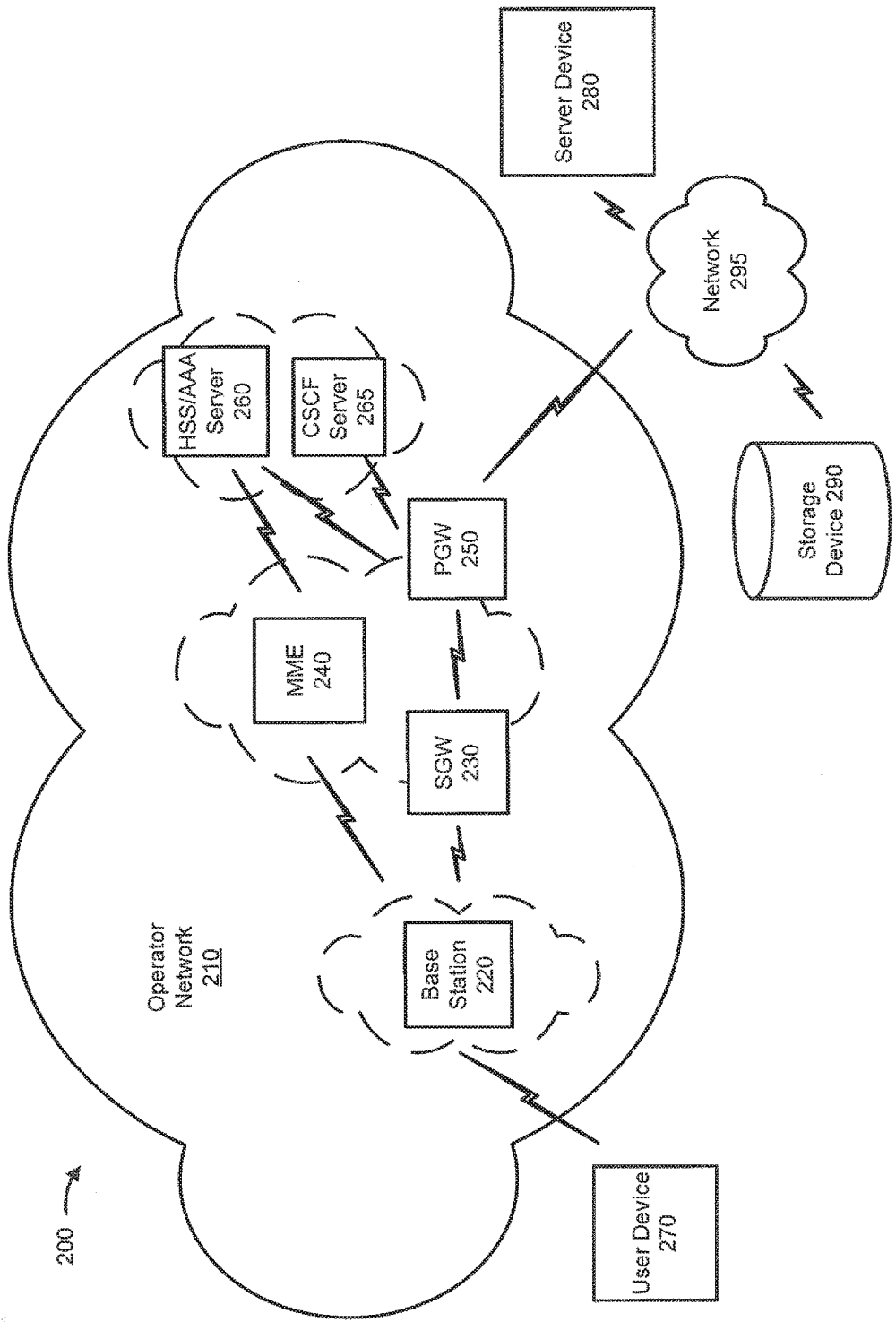
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operator network 210. The operator network 210 may include a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), and a call session control function (CSCF) server 265 (hereinafter referred to as "CSCF server 265"). Environment 200 may also include a user device 270, a server device 280, a storage device 290, and a network 295.

Operator network 210 may include an evolved packet system (EPS) that includes a long term evolution (LTE)

network and/or an evolved packet core (EPC) that operate based on a third generation partnership project (3GPP) wireless communication standard. The LTE network may be a radio access network (RAN) that includes one or more base stations, such as eNodeBs (eNBs), via which user device 270 communicates with the EPC. The EPC may include SGW 230, MME 240, and/or PGW 250 that enables user device 270 to communicate with network 295 and/or an Internet protocol (IP) multimedia subsystem (IMS) core. The IMS core may include HSS/AAA server 260 and/or CSCF server 265 and may manage certain information and services, such as authentication, session initiation, account information, and/or a user profile, associated with user device 270. The LTE network may include multiple base stations 220, and the EPC may include multiple SGWs 230, MMEs 240, and/or PGWs 250. Additionally, or alternatively, operator network 210 may include a cellular network, a public land mobile network (PLMN), a second generation (2G) network, a third generation (3G) network, a fourth generation (4G) network, a fifth generation (5G) network, and/or another network.

Base station 220 may include one or more network devices that receive, process, and/or transmit traffic, such as audio, video, text, and/or other data, destined for and/or received from user device 270. In an example implementation, base station 220 may be an eNB device and may be part of the LTE network. Base station 220 may receive traffic from and/or send traffic to network 295 via SGW 230 and PGW 250. Base station 220 may send traffic to and/or receive traffic from user device 270 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 295 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more computation or communication devices that gather, process, search, store, and/or provide information in a manner described herein. For example, MME 240 may perform operations associated with a handoff to and/or from the EPS. MME 240 may perform operations to register user device 270 with the EPS, to handoff user device 270 from the EPS to another network, to handoff user device 270 from the other network to the EPS, and/or to perform other operations. MME 240 may perform policing operations for traffic destined for and/or received from user device 270.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 270 to external packet data networks by being a traffic exit/entry point for user device 270. PGW 250 may perform policy enforcement, packet filtering, charging support, lawful intercept, and packet screening. PGW 250 may also act as an anchor for mobility between 3GPP and non-3GPP technologies. PGW 250 may authenticate user device 270 (e.g., via interaction with HSS/AAA server 260).

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with user device 270 that identifies applications and/or services that are permitted for and/or accessible by user device 270, bandwidth or data rate thresholds associated with the applications or services, information associated with a user of user device 270 (e.g., a username, a password, a personal identification number (PIN), etc.), a data plan, rate information, minutes allowed, and/or other information. Additionally, or alternatively, HSS/AAA server 260 may include a device that performs authentication, authorization, and/or accounting (AAA) operations associated with a communication session with user device 270. With regard to the authentication operation, HSS/AAA server 260 may verify a device's (e.g., user device 270) specific digital identity provided via an identifier (e.g., a password, a digital certificate, a phone number, etc.) associated with the device. With regard to the authorization function, HSS/AAA server 260 may grant or refuse privileges to a device (e.g., user device 270) for accessing specific services (e.g., IP address filtering, address assignment, route assignment, quality of service (QoS), etc.). With regard to the accounting operation, HSS/AAA server 260 may track consumption of network resources (e.g., by user device 270) and may use this information for management, planning, billing, etc.

CSCF server 265 may include one or more server devices, or other types of computation or communication devices, that gather, process, search, store, and/or provide information in a manner described herein. CSCF server 265 may process and/or route calls to and from user device 270 via the EPC. For example, CSCF server 265 may process calls, received from network 295, that are destined for user device 270. In another example, CSCF server 265 may process calls, received from user device 270, that are destined for network 295.

CSCF server 265 may also include a policy and charging rules function (PCRF) that may perform operations that enforce EPS policies associated with a communication session with user device 270. For example, the PCRF may dynamically provide real-time bandwidth allocations and/or controls (e.g., associated with a particular access point name (APN)) associated with particular applications, network accesses, and/or services provided to user device 270 during a communication session. The PCRF may also dynamically provide a real-time signal flow policy to adapt to changing conditions within the network and/or to manage traffic flow during the communication session.

User device 270 may include any computation or communication device, such as a communication device that is capable of communicating with a network (e.g., network 295) and/or an operator network (e.g., operator network 210). For example, user device 270 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a server, a, a camera, a gaming device, or another mobile, computation, or communication device.

Server device 280 may include one or more server devices, or other types of computational or communication devices, that gather, process, search, store, and/or provide information in a manner described herein. Server device 280 may manage connections (e.g., virtual private network (VPN) connections) with PGWs 250 included in one or more operator networks 210. Server device 280 may be part of operator network 210, or may be an external device to operator network 210. In an example implementation, server device 280 may be operated by an operator of operator network 210. Additionally, or alternatively, server device 280 may include a communication interface that allows server device 280 to receive information from and/or transmit information to other devices in environment 200.

Storage device 290 may include one or more devices capable of storing and/or searching content and/or a data structure (e.g., a database). In some implementations, storage device 290 may include a communication interface that allows storage device 290 to receive information from and/or transmit information to other devices in environment 200.

Network 295 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a wide area network (WAN), a metropolitan network (MAN), a telephone network (e.g., the Public Switched Telephone Network (PTSSN)), an ad hoc network, an intranet, the Internet, a fiber optic-based network, and/or combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
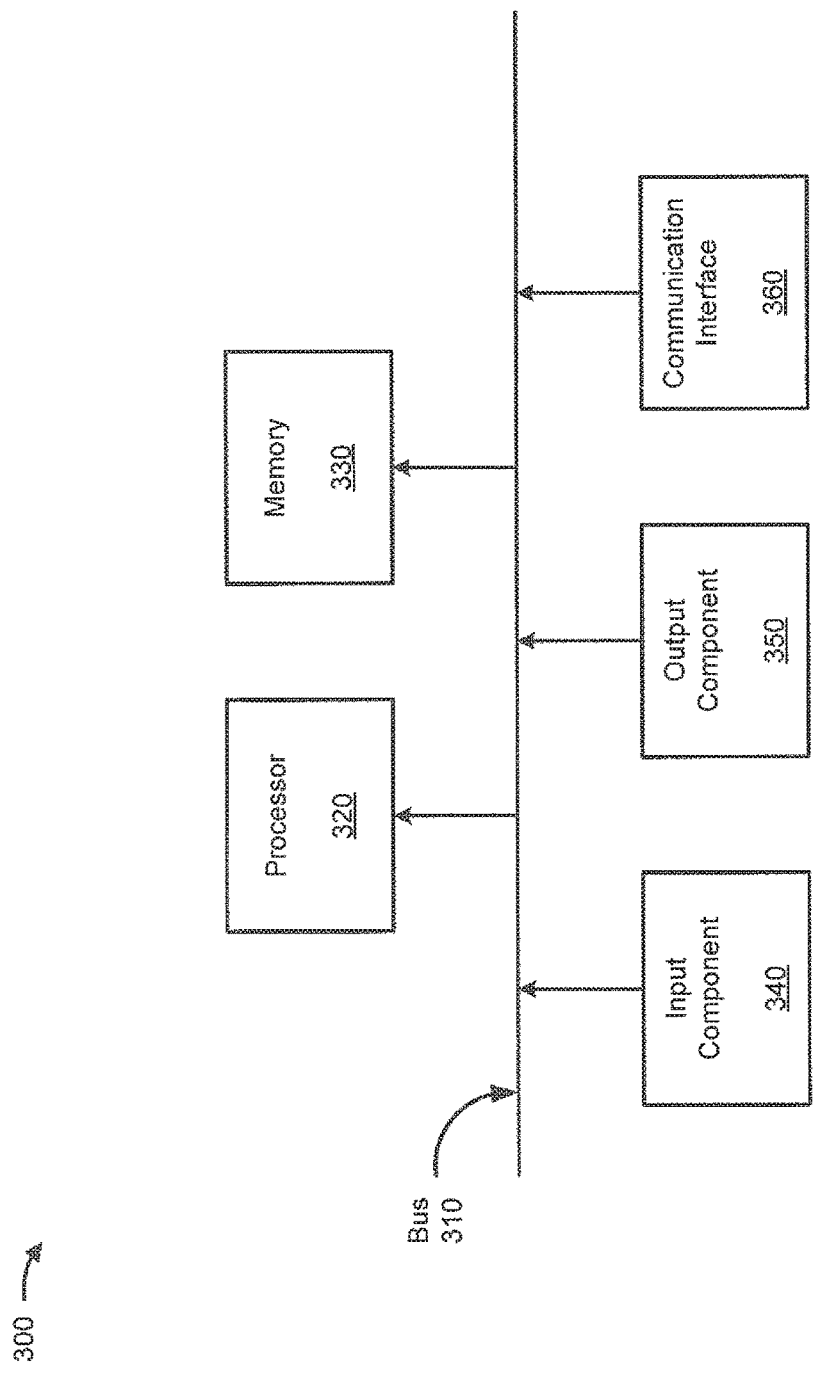
FIG. 3 is a diagram of example components of one or more devices of FIG. 2.

FIG. 3 is a diagram of example components of a device 300. Device 300 may correspond to base station 220, SGW 230, MME 240, PGW 250, HSS/AAA server 260, CSCF server 265, user device 270, server device 280, and/or storage device 290. Alternatively, or additionally, each of base station 220, SGW 230, MME 240, PGW 250, HSS/AAA server 260, CSCF server 265, user device 270, server device 280, and/or storage device 290 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with operator network 210, devices connected to operator network 201, network 295, and/or devices connected to network 295.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIG. 4 is a flowchart of an example process 400 for creating and storing a download account. The download account may allow members to share a data plan and download content associated with the download account using the shared data plan.

In some implementations, one or more process blocks of FIG. 4 may be performed by server device 280. Additionally, or alternatively, one or more process blocks of FIG. 4 may be performed by another device or group of devices separate from or including server device 280.

As shown in FIG. 4, process 400 may include creating a download account (block 410). For example, server device 280 may create the download account.

In some implementations, an account creator (e.g., a user) may use user device 270 or another device to send a request to create the download account to server device 280. Server device 280 may receive the request and create the download account by generating an entry in an account data structure for the download account. Server device 280 may create multiple download accounts and may generate an entry in the account data structure for each download account. The account data structure may be stored in storage device 290 and/or a memory of server device 280. Server device 280 may grant the account creator administrative rights to manage or change the account.

As further shown in FIG. 4, process 400 may include obtaining member information on a member of the download account (block 420). For example, server device 280 may obtain the member information.

The account creator may identify a member of the download account by inputting member information for the member into user device 270 or another device. User device 270 or the other device may send the member information to server device 280, and server device 280 may receive the member information. The account creator may identify more than one member of the download account and server device 280 may receive member information for more than one member.

The member information may include information related to a member of the download account. For example, the member information may include member identification information that identifies a member, such as a name and/or a member identification ("ID"). The member information may include contact information that may be used to contact the member, such as an email address and/or a phone number. The member information may include device information identifying one more user devices 270 associated with the member. For example, the device information may include a user device ID, a phone number, an IP address, an international mobile subscriber identity ("IMSI"), an international mobile station equipment identity ("IMEI"), a mobile equipment identifier ("MEID"), or the like. The member information may also include operator information indicating an operator network 210 associated with the member. For example, the member information may indicate a member's subscription or affiliation with an operator network 210.

The account creator may not know all of the member information and may not be able to input this information into user device 270 for transmission to server device 280. For example, the account creator may not know a member's device information and operator information. Accordingly, in some implementations, the member may use a user device 270 to transmit this information to server device 280. For example, the member may use user device 270 to connect to server device 280. Data packets sent from user device 270 via the operator network may indicate the device information (e.g., the IMSI) and an operator network 210 affiliated with user device 270. Additionally, or alternatively, the member may input the device information and operator information into user device 270, and transmit the device information and operator information to server device 280. In some implementations, some of the member information may be obtained when the member is authenticated as shown in FIG. 5.

Server device 280 may store the member information in the account data structure for the download account.

As further shown in FIG. 4, process 400 may include associating content with the download account (block 430). For example, server device 280 may associate the content with the download account.

An account owner, the account creator, and/or another member may use user device 270 to upload content to server device 280. Server device 280 may store the content and associate the content with the download account. Server device 280 may store the content in storage device 290 and/or in a memory of server device 280.

The content may be any kind of data. For example, the content may be one or more videos, audio files, photos, documents, applications, programs, or the like.

Server device 280 may store information identifying the content and a location where the content can be obtained from the account data structure.

As further shown in FIG. 4, process 400 may include generating an access point identifier for the download account (block 440). For example, server device 280 may generate the access point identifier.

The access point identifier may identify an access point associated with the download account that may be used by operator network 210 to transmit data between user device 270 and server device 280. For example, the access point identifier may include an APN ID associated with an APN for the download account. The APN is a name of a gateway that operator network 210 (e.g., PGW 250) may use to transmit data between user device 270 and server device 280.

Server device 280 may generate an access point identifier for each download account in the account data structure. The access point identifier for each download account may be stored in the account data structure. In some implementations, server device 280 may generate a different access point identifier for each operator network, a different access point identifier for each member, and/or a different access point identifier for each member per operator network.

As further shown in FIG. 4, process 400 may include providing the access point identifier to operator network 210 (block 450). For example, server device 280 may provide the access point identifier to operator network 210. Operator network 210 may create a new access point at PGW 250 that is identified by the access point identifier. For example, operator network may create a new APN at PGW 250. Accordingly, operator network 210 may use the new access point at PGW 250 to connect user device 270 and server device 280.

Server device 280 may provide the access point identifier to more than one operator network 210. For example, server device 280 may provide the access point identifier to each operator network 210 affiliated with a member of the download account.

As further shown in FIG. 4, process 400 may include establishing an account data plan, associated with the access point identifier, with operator network 210 (block 460). For example, server device 280 may establish the account data plan with operator network 210. Server device 280 may instruct operator network 210 to charge the account data plan for data transmitted over the access point at PGW 250 identified by the access point identifier.

In some implementations, server device 280 may instruct operator network 210 to charge the account data plan for all data transmitted over the access point. Additionally, or alternatively, server device 280 may instruct operator network to charge the account data plan for only some of the data transmitted over the access point. For example, server device 280 may instruct operator network 210 to charge the account data plan for a certain percentage or a certain amount of data transmitted over the access point. Operator network 210 may charge a remaining percentage or amount to an operator network data plan associated with user device 270.

Server device 280 may establish an account data plan with more than one operator network 210. For example, server device 280 may establish an account data plan with each operator network 210 affiliated with a member of the download account. Accordingly, server device 280 may have an account data plan A with operator network A and an account data plan B with operator network B.

Server device 280 may have an existing data plan or arrangement with operator network 210 that may be used for the account data plan. For example, server device 280 may be operated by a network operator having prior data agreements with other operator networks 210. The other operator networks 210 may charge the network operator for data transmitted over the other operator networks using the access point identifier according to the prior agreements. Additionally, or alternatively, server device 280 may create a new data plan or arrangement with an operator network 210 that will be charged for data transmitted over the access point identified by the access point identifier. The agreement(s) between server device 280 and operator network(s) 210 may occur dynamically by active/dynamic negotiation.

As further shown in FIG. 4, process 400 may include generating a shared data plan for the download account (block 470). For example, server device 280 may generate the shared data plan.

Server device 280 may transmit information regarding a set of available shared data plans to user device 270. The account creator may use user device 270 to select a shared data plan from the set of available shared data plans. User device 270 may then transmit information on the selected shared data plan to server device 280 and server device 280 may generate the shared data plan for the download account based on the selected shared data plan.

The shared data plan may be a pre-paid data plan with a fixed amount of data usage (e.g., 10 gigabytes (GB), 50 GB, unlimited) that all the members of the download account may use. Accordingly, the account creator may pay a fixed fee for the pre-paid data plan up front. Once the fixed amount of data has been used by the members, the download account may be terminated or the account creator may have the option of adding more data to the shared data plan (possibly for a fee).

Additionally, or alternatively, the shared data plan may be a post-paid data plan based on an actual amount of data used by the members over operator networks 210. Accordingly, the account creator may pay a fee depending on how much data the members actually use over operator networks 210.

In some implementations, the shared data plan may or may not be used to pay for all the data used to provide the content to a member. Accordingly, server device 280 may set an amount of data usage that the shared data plan will be used to pay for (e.g., all or some). Furthermore, server device 280 may set an amount of data usage that a member's operator network data plan will be used to pay for (e.g., none or some).

For example, server device 280 may set that the shared data plan be used to pay for all the data used by the members when downloading the content associated with the download account. Thus, when a member downloads the content associated with the download account, the shared data plan will be charged for the data used over the operator network and the member's operator network data plan will not be charged. In other words, the download account may be set up as a free download account where the members may download the content without being charged for any data usage.

Additionally, or alternatively, server device 280 may set that the shared data plan is to be charged for a certain percentage or amount of the data used by the members. For example, when a member downloads the content associated with the download account, the shared data plan will be charged for a percentage of the data used and the member's operator network data plan will be charged for the remainder of the data used. In other words, the download account may be set up as a reduced fee download account where members may download the content for a reduced data fee.

In some implementations, the shared data plan may be shared by the members of the download account to pay for data used over multiple operator networks 210. The shared data plan may be charged or updated when an account data plan is charged by operator network 210 for data transmitted using the access point identifier. For example, assume server device 280 establishes an account data plan A with operator network A and establishes an account data plan B with operator network B. When a member affiliated with operator network A downloads content over operator network A using the access point identifier, operator network A may charge account data plan A. Server device 280 may charge or update the shared data plan according to the charge to account data plan A. For instance, if operator network A charges data plan A for 1 GB of data, server device 280 may deduct 1 GB of data from the shared data plan. Likewise, when a member affiliated with operator network B downloads content over operator network B using the access point identifier, operator network B may charge account data plan B. Server device 280 may charge or update the shared data plan based on the charge to account data plan B. For instance, if operator B charges data plan B for 2 GB of data, server device 280 may deduct 2 GB of data from the shared data plan. Thus, the shared data plan may have a total of 3 GB of data deducted based on the 1 GB used over operator network A and the 2 GB used over operator network B. In this way, the shared data plan may be used to pay for data used over multiple operator networks 210.

Server device 280 may store shared data plan information in the account data structure. The shared data plan information may include information on the kind of shared data plan and a current status of the shared data plan (e.g., an amount of data currently used by members or currently remaining in the shared data plan).

As further shown in FIG. 4, process 400 may include setting download account options (block 480). For example, server device 280 may set the download account options for the download account.

The account creator may input download account options into user device 270, and user device 270 may transmit the download account options to server device 280. Server device 280 may set the download account options based on the account creator input.

In some implementations, to set the download account options, server device 280 may set a limit on the amount of content associated with the download account. For example, the amount of content that may be uploaded by the account creator and/or by other members of the download account, and stored by server device 280 may be limited to a certain amount (e.g., 10 GB, 50 GB, unlimited, etc.).

In some implementations, to set the download account options, server device 280 may set a time limit for the download account. For example, the download account may only be active for a certain length of time before being deactivated and/or deleted by server device 280.

In some implementations, to set the download account options, server device 280 may restrict usage of the shared data plan between certain time periods and/or certain locations. For example, server device 280 may restrict members from using the shared data plan between certain hours of the day that may be peak times the operator networks 210 are used. The agreements between the operator networks 210 and server device 280 may charge higher fees for data used during these peak times.

In some implementations, to set the download account options, server device 280 may set restrictions on roaming for members. For example, operator network 210 may charge a higher price for data acquired while roaming, and the account creator may not want to pay that higher price. Accordingly, server device 280 may allow members to download the content while roaming or restrict members from downloading the content while roaming.

In some implementations, to set the download account options, server device 280 may apply limitations to one or more members of the download account and/or give administrative rights to one or more members.

For example, server device 280 may limit the amount of data each member may use from the shared data plan. For instance, one member may be authorized to download more data than another member.

Additionally, or alternatively, each member may only be authorized to download certain content associated with the download account. In other words, each content associated with the download account may be associated with a member or members that are permitted to download the content. For example, assume a photographer is the account creator and requests server device 280 create a download account having the photographer's clients as members. The photographer may specify which pictures may be downloaded by which clients. Thus, each client may only be authorized to download pictures that the photographer authorized them to download, and the clients would not have access to pictures taken for other clients. Additionally, or alternatively, each member may be authorized to download all the content associated with the download account. For example, consider a download account having the attendees of a wedding as members. Further, assume the download account is associated with pictures of the wedding. Each attendee may be authorized to download all the pictures of the wedding.

Additionally, or alternatively, server device 280 may set what members can upload content to be associated with the download account based on the account creator's input. In some implementations, only the account creator may be authorized to upload content. For example, if the account creator is a commercial entity (e.g., a photographer), the commercial entity may want to control what content is uploaded to the download account. In some implementations, one or members of the download account may be authorized to upload content. For example, if the download account is set up for members to share content with each other (e.g., pictures taken by attendees at a wedding), each member may be authorized to upload content to be associated with the download account.

Server device 280 may store the download account options in the account data structure.

Server device 280 may charge the account creator and/or another responsible person for creating and managing the download account. Server device 280 may charge the account creator and/or the other responsible person for the download account in an amount that may depend on the shared data plan selected (e.g., an amount of data that can be used by the members over operator networks 210), and/or the download account options (e.g., an amount of content associated with the download account stored by server device 280). Thus, an account owner, an account creator, and/or another responsible person may pay for the account. For example, a sponsor my pay for the download account. The sponsor may be an advertiser that allows members to upload content to the account and manage the account. However, the advertiser may add advertisements to the content or transmit advertisements with the content when the content is downloaded from the account.

While a series of blocks has been described with regard to FIG. 4, the blocks and/or the order of the blocks may be modified in some implementations. Additionally, or alternatively, non-dependent blocks may be performed in parallel.

FIG. 5 is a flowchart of an example process 500 of authenticating a member of the download account. In some implementations, one or more process blocks of FIG. 5 may be performed by server device 280. Additionally, or alternatively, one or more process blocks of FIG. 5 may be performed by another device or a group of devices separate from or including server device 280.

As shown in FIG. 5, process 500 may include requesting a member to download an account application on user device 270 (block 510). For example, server device 280 may send a request to a member to download the account application on user device 270.

Server device 280 may use the contact information for the member stored in the account data structure to send the request to the member. The request may include instructions on how to download and install the application. The request may also include a password to authenticate the member. The password may be a string of characters of any length. The request may ask the member to connect to the member's operator network 210 to download the application. For example, the contact information may include an email address associated with the member. Server device 280 may send an email to the email address requesting the member to download the application on user device 270. Additionally, or alternatively, the member may use user device 270 to request the application. The member may then use user device 270 to download the application. In some implementations, server device 280 may provide the application to user device 270. Additionally, are alternatively, another device may provide the application to user device 270.

The account application may be used to authenticate the member. For example, the member may use the application to input member identification information, such as a member name, the contact information used to receive the request (e.g., an email address), and/or a password identified in the request to download the application. The application may also gather other member information from user device 270 (e.g., a user device ID, an operator affiliation, an IMSI, etc.). The application may use user device 270 to create a connection to server device 280 and send the member information from user device 270 to server device 280.

Additionally, or alternatively, the account application may be used by user device 270 to obtain content from server device 280 after authentication is completed. This process will be discussed with regards to FIG. 6.

As further shown in FIG. 5, process 500 may include receiving the member information from user device 270 executing the account application (block 520). For example, server device 280 may receive the member information from user device 270. In some implementations, the member information may be received from third party services.

The member information received at block 520 may be added to the member information received at block 420. For example, the account creator may not have known or had access to a user device ID, an operator network affiliation, an IMSI, or the like that are associated with a member when creating the download account. However, this unknown member information may be obtained at block 520 by server device 280 from user device 270 executing the application. Accordingly, server device 280 may update the account data structure to include the member information obtained at block 520.

Additionally, or alternatively, server device 280 may receive the member name, the contact information, and/or the password input by the member into the application via user device 270.

As further shown in FIG. 5, process 500 may include authenticating the member (block 530). For example, server device 280 may authenticate the member.

To authenticate the member, server device 280 may confirm that the member name, the contact information, and/or the password input by the member into the application and received by server device 280 matches the member information of the member the request was sent to and/or matches the password included in the request sent by server device 280.

Once a member has been successfully authenticated, server device 280 adds the member to a closed member authentication group. The closed member authentication group includes members that have been authenticated and may access the content using the download account. In some implementations, only authenticated members may use the application to access the content using the download account. Non-authenticated members may not access the content.

In some implementations, once a member has been successfully authenticated, server device 280 may provide the access point identifier to user device 270 to be used by the account application. Accordingly, the account application on user device 270 may be mapped to the access point identifier associated with the download account. In other words, user device 270 may use the account application to access the content associated with the download account using the access point identified by the access point identifier. Additionally, or alternatively, the account application may have included the access point identifier when downloaded by user device 270.

As further shown in FIG. 5, process 500 may include providing the member information of the member to operator network 210 (block 540). For example, server device 280 may provide the member information to operator network 210.

Server device 280 may provide member information for an authenticated member to operator network 210 affiliated with the authenticated member. For example, server device 280 may provide a user device ID and/or an IMSI of user device 270 (e.g., user device 270 with the account application installed) to the operator network 210. Server device 280 may instruct operator network 210 that user device 270 is authorized to use the access point identified by the access point identifier associated with download account. Operator network 210 may store the member information in a memory of HSS/AAA server 260. HSS/AAA server 260 may associate the member information with information already stored about the member in operator network 210 (e.g., a member's operator network data plan with operator network 210). Accordingly, operator network 210 may recognize that the member is authorized to use the access point to communicate with server device 280.

In some implantations, each operator network 210 may be provided with member information corresponding to authenticated members that are affiliated with operator network 210. The operator may store the member information in a memory accessible by HSS/AAA server 260. Accordingly, when user device 270 attempts to connect to server device 280 through operator network 210, HSS/AAA server 260 may use the member information to authenticate that user device 270 is authorized to use the access point at the PGW.

While a series of blocks has been described with regard to FIG. 5, the blocks and/or the order of the blocks may be modified in some implementations. Additionally, or alternatively, non-dependent blocks may be performed in parallel.

FIG. 6 is a flowchart of an example process 600 of providing content to a member of the download account and charging a shared data plan for the data used to provide the content. In some implementations, one or more process blocks of FIG. 6 may be performed by operator network 210 and/or server device 280. Additionally, or alternatively, one or more process blocks of FIG. 6 may be performed by another device or a group of devices separate from or including operator network 210 and/or server device 280.

As shown in FIG. 6, process 600 may include receiving a request from user device 270 to obtain content associated with a download account using an access point identifier (block 605). For example, operator network 210 may receive the request from user device 270.

A member of the download account may use the account application installed on user device 270 to generate a request for the content associated with the download account and stored by server device 280. The application may include the access point identifier in the request. The request may also include member information (e.g., a user device ID). User device 270 may then transmit the request to operator network 210 and operator network 210 may receive the request. Additionally, or alternatively, server device 280 may send the member and/or user device 270 a message indicating content associated with the download account is available for download. For example, server device 280 may send an email, an instant message, and/or a text message (e.g., a short message service (SMS) message and/or a multimedia messaging service (MMS) message) to the member including a link to download the content. Executing the link may generate the request and send the request to operator network 210.

As further shown in FIG. 6, process 600 may include authenticating user device 270 (block 610). For example, operator network 210 may authenticate that user device 270 is authorized to receive data over a connection on the access point identified by the access point identifier in the request. As previously discussed at block 540 (FIG. 5), server device 280 may provide operator network 210 with information on authenticated members allowed to use the access point associated with the download account. Operator network 210 may carry out authentication with HSS/AAA server 260 using an AAA protocol and use the member information to establish that user device 270 is authenticated to use the access point to receive the content. For example, operator network 210 may use a Diameter protocol to carry out authentication (e.g., a Diameter-Extensible Authentication Protocol (EAP)-Request and a Diameter-EAP-Answer).

In some implementations, operator network 210 may determine if user device 270 is roaming. In other words, operator network 210 may determine if user device 270 is affiliated with operator network 210 or if operator network 210 is acting as a roaming network that user device 270 is visiting. User device 270 may use operator network 210 as a roaming network to download the content if operator network 210 has an appropriate agreement with a home network affiliated with user device 270. Additionally, or alternatively, server device 280 may set up the access point associated with the download account with each of the home network and the roaming network for user device 270 to use operator network 210 as a roaming network. In some implementations, user device 270 may use a different access point identifier in a roaming network than in a home network. Additionally, or alternatively, user device 270 may have to be re-authenticated if user device 270 moves from a home network to a roaming network.

As further shown in FIG. 6, process 600 may include transmitting the request to server device 280 (block 615). For example, operator network 210 may transmit the request to server device 280 over network 295. Operator network 210 may create a connection between user device 270 and server device 280 using the access point identified by the access point identifier in the request. Operator network 210 may transmit the request over the connection to the server device 280.

As further shown in FIG. 6 process 600 may include receiving the request to provide content to user device 270 (block 620). For example, server device 280 may receive the request from user device 270 via operator network 210.

As further shown in FIG. 6, process 600 may include determining whether the content may be provided to user device 270 (block 625). For example, server device 280 may determine whether the content may be provided.

To determine whether the content may be provided, server device 280 may determine whether the member associated with user device 270 is authorized to access the content. For example, server device 280 may check the account data structure to determine if the content is associated with the member. If the content is not associated with the member, server device 280 may determine that the content may not be provided to user device 270.

To determine whether the content may be provided, server device 280 may determine whether the member has reached a predetermined data limit. For example, the account creator may have set data limits for each member in the download account. Server device 280 may check the account data structure to determine if the member has reached the predetermined data limit. If the member associated with user device 270 has reached the predetermined data limit or does not have enough data left to download the content, server device 280 may determine that the content may not be provided to user device 270.

To determine whether the content may be provided, server device 280 may determine whether the shared data plan has reached a predetermined data limit. For example, server device 280 may check the account data structure to determine if there is enough data remaining in the shared data plan to provide the content. If there is not enough data remaining in the shared data plan, server device 280 may determine that the content may not be provided to user device 270.

To determine whether the content may be provided, server device 280 may determine whether the download account has been terminated or exceeded the time limit set by the account creator. If the download account has been terminated, server device 280 may determine that the content may not be provided to user device 270.

To determine whether the content may be provided, server device 280 may determine whether a time or a location from which the user device 270 requests the content is restricted. For example, the request may include information on the time and/or the location of user device 270. Server device 280 may use the account data structure to determine whether the time or the location is included in a restricted time period and/or a restricted location. If the time or the location is restricted, server device 280 may determine that the content may not be provided to user device 270.

As further shown in FIG. 6, process 600 may include obtaining the content associated with the download account (block 630). For example, server device 280 may obtain the content if server device 280 determines at block 625 that the content may be provided to user device 270. The request may include information identifying the content. Server device 280 may search the account data structure for the content information corresponding to the content identified in the request. The content information may identify a location in a memory of server device 280 and/or a location in storage device 290 where the content information is stored. Server device 280 may then obtain the content from the memory of server device 280 and/or storage device 290 using the content information.

As further shown in FIG. 6, process 600 may include providing the content to user device 270 via operator network 210 (block 635). For example, server device 280 may provide the content to operator network 210 for transmission to user device 270 over a logical connection (i.e., a PDN connection) created by operator network 210 using the access point associated with the download account.

As further shown in FIG. 6, process 600 may include receiving the content from server device 280 for forwarding to user device 270 (block 640). For example, operator network 210 may receive the content from server device 280 to transmit to user device 270.

As further shown in FIG. 6, process 600 may include charging an account data plan associated with the download account for data used to provide the content to user device 270 (block 645). For example, operator network 210 may charge the account data plan for the data used to provide the content to user device 270. Additionally, or alternatively, operator network 210 may charge the member's operator network data plan if the account data plan is not used to pay for all the data used to provide the content. In some implementations, operator network 210 may charge the member's operator network data plan for roaming charges if applicable.

Operator network 210 (e.g., PGW 250) may establish that the member device is obtaining the content from server device 280 over the access point associated with the download account at PGW 250. PGW 250 may send a credit control request to the PCRF and receive a credit control answer indicating a value that should be included in a used service unit for the account data plan and the member's operator network data plan. Accordingly, the account data plan may be charged for some or all of the data used to provide the content to user device 270 and the member's operator network data plan can be charged for the remainder, if any.

As further shown in FIG. 6, process 600 may include forwarding the content to user device 270 (block 650). For example, operator network 210 may provide or forward the content to user device 270. Accordingly, user device 270 may receive the content.

As further shown in FIG. 6, process 600 may include providing account data plan information to server device 280 (block 655). For example, operator network 210 may provide account data plan information to server device 280. The account data plan information may include information on the data used over the access point by the authenticated download account members in the operator network 210 and a charge associated with the data. For example, the account data plan information may indicate that 1 GB of data was used over the access point and 1 GB of data was charged to the account data plan between server device 280 and network operator 210. For instance, if operator network A operates server device 280, operator network B may inform operator network A of an amount of data used over the access point by members in operator network B, and operator network A may pay operator network B for the data according to existing agreements. In some implementations, the account data plan information may be provided to server device 280 at predetermined times (e.g., hourly, daily, weekly, etc.). Additionally, or alternatively, the account data plan information may indicate an amount of data used per user and/or an aggregated amount of data used by more than one user.

As further shown in FIG. 6, process 600 may include receiving the account data plan information from operator network 210 (block 660). For example, server device 280 may receive the account data plan information from operator network 210.

As further shown in FIG. 6, process 600 may include charging a shared data plan for the download account based on the account data plan information (block 665). For example, server device 280 may charge or update the shared data plan based on the account data plan information. In some implementations, server device 280 may receive account data plan information from more than one operator network 210, and update the shared data plan based on the account data plan information from multiple operator networks 210. Accordingly, members may share the shared data plan independent of the members' affiliations with operator networks 210.

In some implementations, server device 280 may subtract an amount of data from the shared data plan limit based on the amount of data used by members on the affiliated operator networks 210. For example, if the download account is associated with a pre-paid plan with a predetermined amount of data, the amount of data remaining in the shared data plan may be updated by subtracting an amount of data used by members on operator networks 210.

In some implementations, server device 280 may add the amount of data used by members on the affiliated operator networks 210 and calculate a total amount of data used. For example, if the shared data plan is a post-paid plan, server device 280 may charge for the total amount of data used.

In some implementations, server device 280 may allow the account creator and/or members to access information on the status of the download account. For example, server device 280 may send a message to the account creator and/or one or more other members and/or allow access to a web site indicating the status of the shared data plan (e.g., amount of data remaining).

User device 270 may use the application to obtain the content from server device 280 using other networks than operator network 210. For example, user device 270 may use a public or home Wi-Fi connection and/or another access network to connect to server device 280 via network 295. In such a case, user device 270 may not be charged for the data used over the Wi-Fi connection to obtain the content and the shared data plan for the download account may not be charged for content acquired by user device 270.

In some implementations, server device 280 may terminate the download account. For example, the account creator may request server device 280 to terminate the download account. Additionally, or alternatively, server device 280 may terminate the download account because the shared data plan may have reached the predetermined limit and/or a length of time set for the download account has expired. Server device 280 may terminate the download account by deleting the content associated with the download account and deleting the download account entry in the account data structure.

While a series of blocks has been described with regard to FIG. 6, the blocks and/or the order of the blocks may be modified in some implementations. Additionally, or alternatively, non-dependent blocks may be performed in parallel.

Figure 7B:
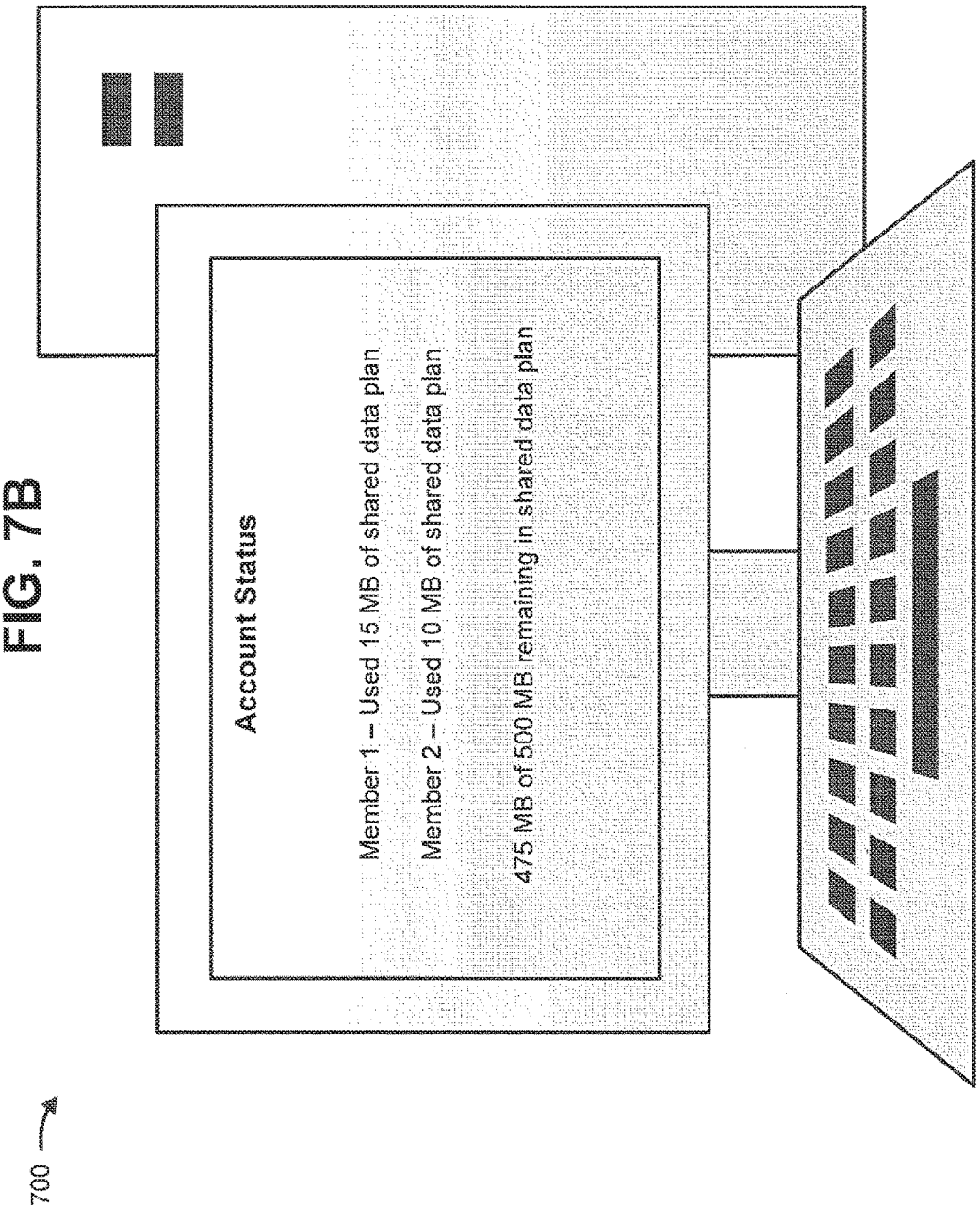

FIGS. 7A and 7B are diagrams of an example implementation 700 relating to process 600 shown in FIG. 6. Assume in example implementation 700, an account creator wants to allow attendees of a wedding to download pictures taken at the wedding without the attendees' data plans incurring high data costs. Assume the account creator requests a server device to create a download account including a shared data plan with a limit of 500 megabytes (MB). Further, assume the account creator designates two download account members, member A and member B. The account creator may upload content to the download account and may designate that member A and/or member B may upload content to the download account. Also, assume member A uses a user device 710, is affiliated with an operator network A, and has all data paid for by the shared data plan. Further, assume member B uses a user device 720, is affiliated with an operator network B, and has two thirds of data paid for by the shared data plan.

As shown in FIG. 7A, member A uses user device 710 to download a photo from the server device via operator network A. User device 710 receives 15 MB of data over operator network A to obtain the photo. However, member A's data plan with operator network A is not charged for any of the data. Instead, the shared data plan associated with the download account is charged for 15 MB of data.

As shown in FIG. 7A, member B uses user device 720 to download a photo from the server device via operator network B. User device 720 receives 15 MB of data over operator network B to obtain the photo. However, member B's data plan with operator network B is only charged for a third of the data (i.e., 5 MB). On the other hand, the shared data plan associated with the download account is charged for two thirds of the data (e.g., 10 MB).

As shown in FIG. 7B, an account creator and/or members A and B may access a website indicating a download account status. For example, the download account status may include the amount of data used by each member of the download account. For instance, the download account status may indicate that member A has used 15 MB of the shared data plan and that member B has used 10 MB of the shared data plan. The download account status may also indicate that 475 MB of the original 500 MB are remaining in the shared data plan.

Implementations described herein may allow members of a download account to share a data plan to download content associated with the download account independent of operator network affiliations.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A server device, comprising:
   a memory; and
   one or more processors to:
     store content accessible by the server device,
       the server device including information identifying a shared data plan,
         the information including encrypted personal information regarding one or more users that are members of the shared data plan, and
         the shared data plan being updated based on data used on an operator network to provide the content, from the server device, to the one or more users,
         the operator network including at least one of:
           a long term evolution (LTE) network,
           a cellular network,
           a public land mobile network (PLMN),
           a second generation (2G) network,
           a third generation (3G) network,
           a fourth generation (4G) network, or
           a fifth generation (5G) network;
     generate an access point identifier for the shared data plan;
     receive a request for the content from a user device associated with a user of the one or more users,
       the request including the access point identifier;
     provide, via an access point identified by the access point identifier, the content to the user device based on receiving the request,
       the content being provided to the user device without a data plan, between the user device and the operator network, being charged; and
     update, based on a particular amount of data used to provide the content from the server device, via the operator network, to the user device, the shared data plan to indicate that the particular amount of data has been used,
       the shared data plan being different than the data plan between the user device and the operator network.

2. The server device of claim 1, where the one or more processors are further to:
   receive, from the operator network, information indicating the particular amount of data used to provide the content from the server device to the user device; and
   where the one or more processors, when updating the shared data plan, are to:
     update the shared data plan based on the information indicating the particular amount of data used to provide the content.

3. The server device of claim 1, where the one or more processors, when updating the shared data plan, are to:
   update the shared data plan by subtracting the particular amount of data from a limit of the shared data plan.

4. The server device of claim 1, where the one or more processors, when updating the shared data plan, are to:

update the shared data plan by adding the particular amount of data to an amount of data used by the members.

5. The server device of claim 1, where the request is received via an application on the user device.

6. The server device of claim 1, where the one or more processors are further to:
provide, to the operator network, information on authenticated members associated with the shared data plan.

7. The server device of claim 1, where the one or more processors are further to:
determine whether a data limit of the shared data plan has been reached; and
where the one or more processors, when providing the content to the user device, are to:
selectively provide the content to the user device based on determining that the data limit has not been reached,
the content not being provided based on determining that the data limit has been reached.

8. A non-transitory computer-readable medium storing instructions, the instructions comprising:
one or more instructions that, when executed by a processor of a server device, cause the processor to:
store content accessible by the server device,
the server device including information identifying a shared data plan,
the information including encrypted personal information regarding one or more users that are members of the shared data plan, and
the shared data plan being updated based on data used on an operator network to provide the content, from the server device, to the one or more users;
generate an access point identifier for the shared data plan;
receive, via the operator network, a request for the content from a user device associated with a user of the one or more users,
the request including the access point identifier;
provide, via an access point identified by the access point identifier, the content to the user device based on receiving the request,
the content being provided to the user device without a data plan, between the user device and the operator network, being charged; and
update, based on a particular amount of data used to provide the content from the server device, via the operator network, to the user device, the shared data plan to indicate that the particular amount of data has been used,
the shared data plan being different than the data plan between the user device and the operator network.

9. The non-transitory computer-readable medium of claim 8, where the one or more instructions that, when executed by the processor, further cause the processor to:
determine whether the user is authorized to receive the content; and
where the one or more instructions, that cause the processor to provide the content to the user device, cause the processor to:
provide the content to the user device based on determining that the user is authorized to receive the content.

10. The non-transitory computer-readable medium of claim 8, where the one or more instructions that, when executed by the processor, further cause the processor to:
determine whether the user has reached a predetermined data limit; and
where the one or more instructions, that cause the processor to provide the content to the user device, cause the processor to:
provide the content to the user device based on determining that the user has not reached the predetermined data limit.

11. The non-transitory computer-readable medium of claim 8, where the one or more instructions that, when executed by the processor, further cause the processor to:
determine whether a download account associated with the shared data plan has exceeded a time limit; and
where the one or more instructions, that cause the processor to provide the content to the user device, cause the processor to:
provide the content to the user device based on determining that the download account has not exceeded the time limit.

12. The non-transitory computer-readable medium of claim 8, where the one or more instructions that, when executed by the processor, further cause the processor to:
determine a location at which the user device is located; and
determine that the location is not a restricted location to which the content is restricted; and
where the one or more instructions, that cause the processor to provide the content to the user device, cause the processor to:
provide the content to the user device based on determining that the location is not a restricted location.

13. The non-transitory computer-readable medium of claim 8, where the one or more instructions that, when executed by the processor, further cause the processor to:
determine that the shared data plan has reached a predetermined limit; and
terminate a download account associated with the shared data plan based on determining the shared data plan has reached the predetermined limit.

14. The non-transitory computer-readable medium of claim 8, where the one or more instructions that, when executed by the processor, further cause the processor to:
provide, to the operator network, information indicating that the user is authorized to use the access point.

15. A method, comprising:
storing, by a server device, content,
the server device including information identifying a shared data plan,
the information including encrypted personal information regarding one or more users that are members of the shared data plan, and
the shared data plan being updated based on data used on an operator network to provide the content, from the server device, to the one or more users;
generating, by the server device, an access point identifier for the shared data plan;
receiving, by the server device, a request for the content from a user device associated with a user of the one or more users,
the request including the access point identifier;
providing, by the server device and via an access point identified by the access point identifier, the content to the user device,
the content being provided to the user device without a data plan, between the user device and the operator network, being charged; and updating, by the server device and based on a particular amount of data used to provide the content from the server device, via the operator network, to the user device, the shared data plan to indicate that the particular amount of data has been used,
the shared data plan being different than the data plan of the user device.

16. The method of claim 15, where the user device is a first user device, the request is a first request, the content is first content, and the particular amount of data is a first particular amount of data; and
where the method further comprises:
receiving a second request for second content from a second user device;
providing the second content to the second user device based on receiving the second request; and
updating, based on a second particular amount of data used to provide the second content to the second user device, the shared data plan to indicate that the second particular amount of data has been used,
the shared data plan being updated without a data plan of the second user device being updated.

17. The method of claim 15, further comprising:
sending a message to the user,
the message indicating an amount of data remaining in the shared data plan.

18. The method of claim 15, further comprising:
determining that the shared data plan has reached a time limit; and
terminating the shared data plan based on the determining that the shared data plan has reached the time limit.

19. The method of claim 15, further comprising:
determining whether the user device has reached a predetermined data limit; and
where providing the content to the user device comprises:
providing the content to the user device based on determining that the user device has not reached the predetermined data limit.

20. The method of claim 15, where the user device is a first user device and the operator network is a first operator network;
where providing the content to the first user device comprises:
providing, via the first operator network, the content to the first user device;
where the method further comprises:
providing, via a second operator network, the content to a second user device; and
where updating the shared data plan comprises:
updating the shared data plan based on providing the content to the first user device and based on providing the content to the second user device.

* * * * *